United States Patent [19]

Nagano et al.

[11] Patent Number: 5,165,006
[45] Date of Patent: Nov. 17, 1992

[54] VEHICLE MOTOR SWITCHING APPARATUS

[75] Inventors: Toshihiro Nagano; Yasuaki Kyoukane, both of Omiya, Japan

[73] Assignee: Fuji Jukogyo Kabushiki Kaisha, Tokyo, Japan

[21] Appl. No.: 601,134

[22] Filed: Oct. 23, 1990

[30] Foreign Application Priority Data

Oct. 24, 1989 [JP] Japan .................................. 1-278186
Oct. 25, 1989 [JP] Japan .................................. 1-279106

[51] Int. Cl.⁵ ........................... H02P 7/12; H02P 5/00
[52] U.S. Cl. .................................................... 388/803
[58] Field of Search ............... 388/801, 803, 807, 808, 388/826

[56] References Cited

U.S. PATENT DOCUMENTS 3,755,724  8/1973 Anderson .
4,114,076  9/1978 Teranishi et al. .
4,171,506 10/1979 Horiuchi et al. .

Primary Examiner—David Smith, Jr.
Attorney, Agent, or Firm—Beveridge, DeGrandi & Weilacher

[57] ABSTRACT

Thers is provided a vehicle motor switching apparatus having an armature coil, a series circuit including a series coil and connecting the armature coil and a battery and a shunt coil, comprising a switch for connecting the shunt coil to the series circuit in parallel to the armature coil to set up the motor as a compound-wound motor when the shunt coil is connected to the series circuit, while set up the motor as a series motor when disconnected therefrom. The apparatus further comprises a switch for disconnecting the series coil from the series circuit to set up the motor as a shunt motor when the shunt coil is connected to the series circuit and the series circuit is disconnected therefrom.

23 Claims, 14 Drawing Sheets

| | SERIES MOTOR | SHUNT MOTOR | COMPOUND-WOUND MOTOR |
|---|---|---|---|
| SW4 | OFF | ON | ON |
| SW5 | ON | OFF | ON |
| SW6 | OFF | ON | OFF |

VEHICLE MOTOR SWITCHING APPARATUS

BACKGROUND OF THE INVENTION

This invention relates to a vehicle motor switching apparatus for selecting a type of a vehicle motor among a series motor, a compound-wound motor and a shunt motor.

A vehicle motor is mostly driven by a battery installed in a vehicle, particularly an electric vehicle which has been developed or being free of petroleum dependence and being less polluting. Controllable of such a motor is one of the important factors in determining the vehicle performance.

The Japanese Utility Model Publication No. 1983(58)-21284 discloses such motor control. The control apparatus disclosed therein comprises a feeder circuit including a controller for adjusting a voltage or a current applied to a motor in response to an amount of depression of an accelerator.

Also, the apparatus comprises a brake circuit for braking the motor by short-circuiting two terminals of the motor and a switch interlocked by the accelerator for switching the two circuits.

The feeder circuit is driven to rotate the motor when the accelerator is depressed. On the other hand, the brake circuit is driven to brake the motor when the accelerator is released.

As is already known, a motor driven by means of a d.c. current from a battery is roughly classified into a series motor, a compound-wound motor and a shunt motor according to a wiring configuration of coils for exciting field poles.

Those motors are selectively used. However, only one type of motor is sometimes not sufficient for an electric vehicle which should be operated at various travelling conditions.

The series motor produces a large starting torque for excellent starting acceleration but also has a large speed variation and increases an engine speed greatly as load torque to the motor is made small.

On the other hand, the shunt motor has low speed variation or stable engine speed even if the load torque varies but also has relatively a small speed control region when a load is connected thereto.

Furthermore, the compound-wound motor has characteristics intermediate between the series motor and the shunt motor and a slow response to the change of the operating state.

SUMMARY OF THE INVENTION

The object of the present invention is to provide an apparatus which switches a type of a vehicle motor according to travelling conditions to obtain best motor characteristics so as to improve vehicle performance.

According to the present invention, there is provided a vehicle motor switching apparatus having an armature coil, a series circuit including a series coil and connecting the armature coil and a battery and a shunt coil, comprising a switch for connecting the shunt coil to the series circuit in parallel to the armature coil to set up the motor as a compound-wound motor when the shunt coil is connected to the series circuit, while setting up the motor as a series motor when disconnected therefrom.

The apparatus further comprises a switch for disconnecting the series coil from the series circuit to set up the motor as a shunt motor when the shunt coil is connected to the series circuit and the series circuit is disconnected therefrom.

The other objects and features of this invention will become understood from the following description with reference to the accompanying drawings.

DESCRIPTION OF THE PREFERRED EMBODIMENT

Figure 1:
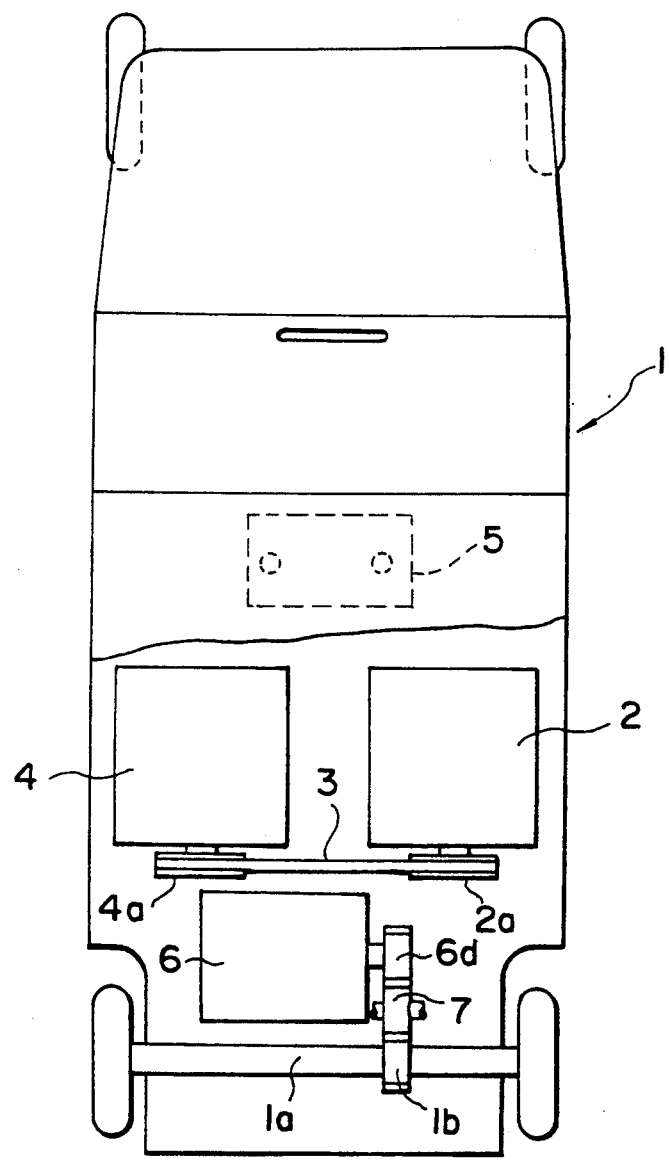
FIG 1 shows the configuration of an electric vehicle.

The present invention will now be described in detail with reference to the accompanying drawings.

Throughout the drawings, like reference numerals and letters are used to designate like or equivalent elements for the sake of simplicity of explanation.

First in FIG. 1, an electric automobile 1 comprises an engine 2 having a crankshaft pulley 2a to which a pulley 4a of a generator 4 is connected through a belt 3. A battery 5 is charged by the generator 4. The generator 4 also acts as a starter when the engine 2 starts. A drive gear 1b mounted on an axle shaft 1a is connected to a drive gear 6d of a motor 6 through an idler gear 7.

The motor 6 is a d.c. motor. The output of the engine 2 is converted into electrical energy. The battery 5 is then charged with the electrical energy. The motor 6 is thus driven by means of the charged electrical energy. Thus, the electric automobile 1 is a serial hybrid vehicle.

Figure 2:
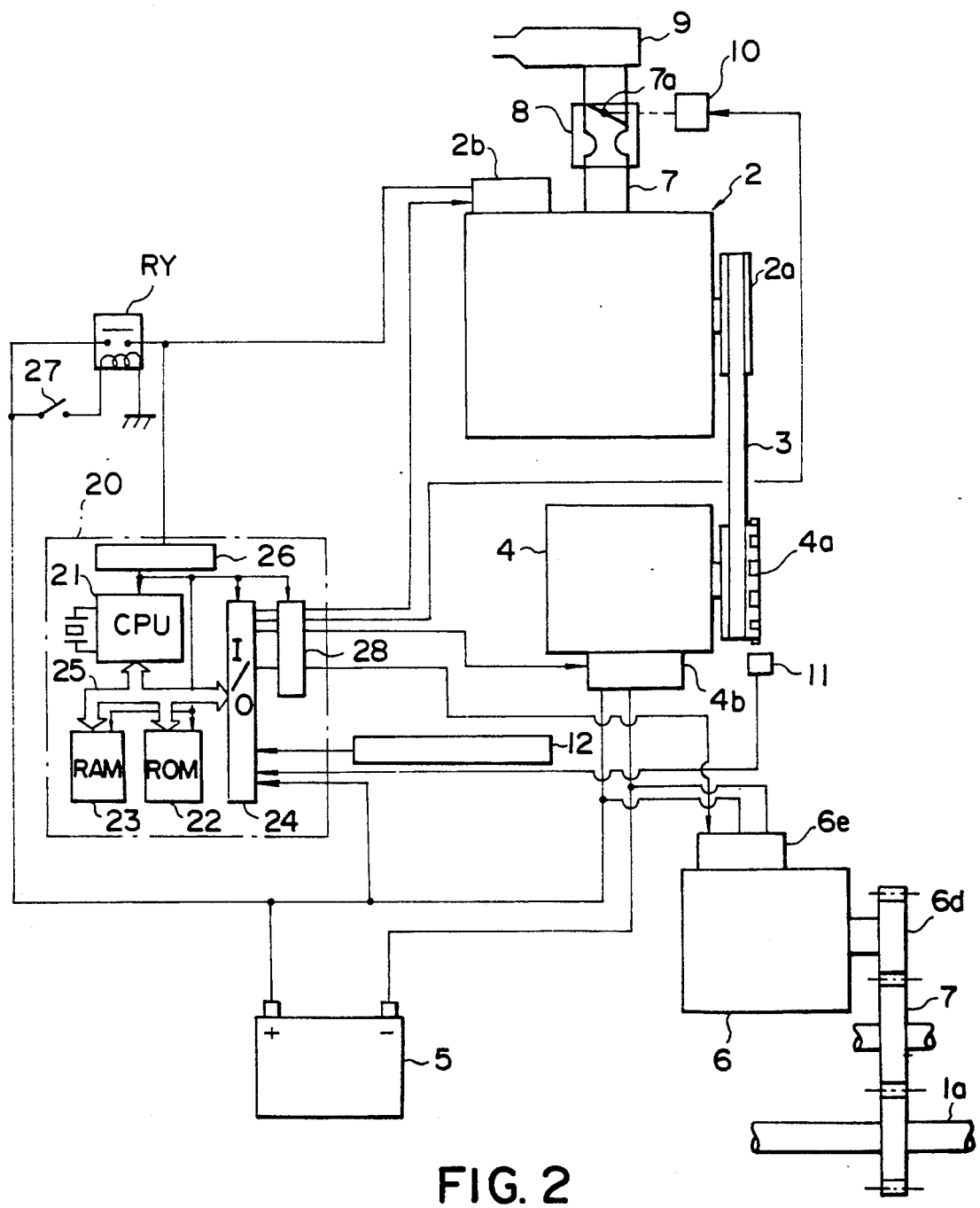
FIG. 2 shows a preferred embodiment of a control system according to the present invention.

The engine 2 is a gasoline engine. As is shown in FIG. 2, a carburetor 8 is provided in an intake pipe 7. An air cleaner 9 is attached to the intake pipe 7 upstream the carburetor 8. Furthermore, a rotary actuator 10 composed of such as a stepping motor or a rotary solenoid is attached to a throttle valve 7a installed in the intake pipe 7.

There are provided protrusions on the outer periphery of the pulley 4a of the generator 4. A generator-rotating speed detection sensor 11 which is composed of such as an electromagnetic pickup detecting the protrusions is provided to face the protrusions.

A controller 20 consisting of a microcomputer comprises a CPU (central processing unit) 21, a ROM (read only memory) 22, a RAM (random access memory) 23 and an I/O (input/output) interface 24 connected to each other through a bus line 25. A constant-voltage power supply 26 connected to the battery 5 through a relay contact of a control relay RY supplies electrical power to those components of the controller 20.

The control relay RY is also connected to the battery 5 through a key switch 27 and an ignition circuit 2b of the engine 2. Furthermore, a generator control circuit 4b and a motor control circuit 6e are connected to the battery 5 to be supplied with the electrical power.

Variable sensors including the generator-rotating speed sensor 11 and an accelerator depression amount sensor 12 are connected to an input port of the I/O interface 24. Also, a positive terminal of the battery 5 is connected to the input port to supply a terminal voltage, thereto.

Furthermore, the rotary actuator 10, the ignition circuit 2b, the generator control circuit 4b and the motor control circuit 6e are connected to an output port of the I/O interface 24 through a drive circuit 28.

Figure 3:
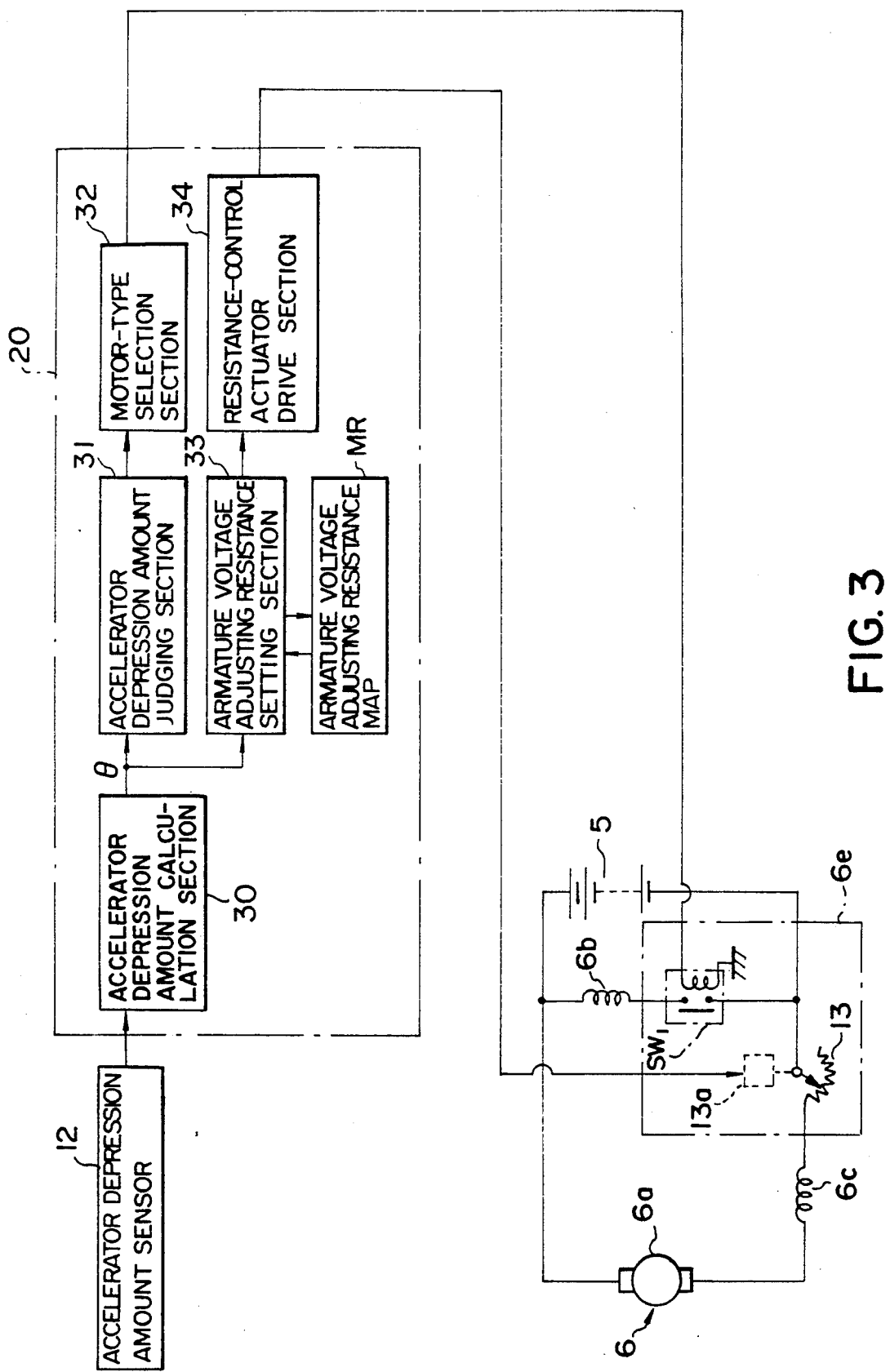
FIG. 3 shows a functional block diagram of the control system shown in FIG. 2.

In the motor 6 as shown in FIG. 3, a series circuit of a shunt coil 6b and a normally-open contact of a relay switch SWI is connected to the battery 5 in parallel to an armature coil 6a. Furthermore, a series circuit of a series coil 6c and an armature voltage adjusting resistor 13 is connected to the battery 5 in series to the armature coil 6a.

Accordingly, the motor 6 is switched to a series motor or a compound-wound motor by means of the relay switch SW1. Thus, the motor 6 is constituted as the series motor by disconnecting the shunt coil 6b from the battery 5 when the switch SW 1 is off. The motor 6 is constituted as the compound-wound motor by connecting the shunt coil 6b to the battery 5 when the switch SW1 is turned on. A resistance value of the armature voltage adjusting resistor 13 is adjusted by a resistance-control actuator 13a.

The ROM 22 is prestored with a control program and fixed data such as control data. The RAM 23 is stored with the data obtained after the calculation depending upon output each of the sensors and a monitored-value of the terminal voltage of the battery 5.

Signals from each of the sensors are processed by the CPU 21 according to the control program prestored in the ROM 22. And then an engine-stop signal to the ignition circuit 2b, a control signal to the generator control circuit 4b, a drive signal to the rotary actuator 10 and a control signal to the motor control circuit 6e are calculated by the CPU 21.

The opening of the throttle valve 7a of the engine 2 is controlled by the rotary actuator 10 which is driven by the CPU 21. Furthermore, charging the battery 5 is controlled by the generator 4 whose rotation speed is adjusted to a specific value by the CPU 21. The motor 6 is also switched to the series or compound-wound motor-type by the CPU 21.

Next, the motor-type switching function of the controller 20 will be explained. Also in FIG. 3, the controller 20 comprises an accelerator depression amount calculation section 30, an accelerator depression amount judging section 31, a motor-type selection section 32, an armature voltage adjusting resistance setting section 33, an armature voltage adjusting resistance map MR and a resistance-control actuator drive section 34.

An accelerator depression amount $\theta$ is calculated by the calculation section 30 on the basis of a signal from the sensor 12. The amount $\theta$ calculated by the calculation section 30 is judged by the judging section 31 whether the amount $\theta$ is smaller than a preset value $\theta$SET. or not.

The selection section 32 produces a signal when the amount $\theta$ is judged to be smaller than the preset value $\theta$SET ($\theta < \theta$SET) in the judging section 31 and applies the signal to the motor control circuit 6e to turn on the relay switch SW1 so as to connect the shunt coil 6b to the battery 5. The motor 6 is thus switched from the series motor-type to the compound-wound motor-type. On the other hand, the relay switch SW1 is turned off to switch the motor 6 to the series motor-type if $\theta \geq \theta$SET.

Thus, the shunt coil 6b of the motor 6 is intermittently connected to the battery 5 in response to a load such as the amount $\theta$ while the vehicle is travelling. The motor 6 is thus switched to the series motor-type if the amount $\theta$ or the load is large and to the compound-wound motor-type if the amount $\theta$ or the load is small.

Figure 4:
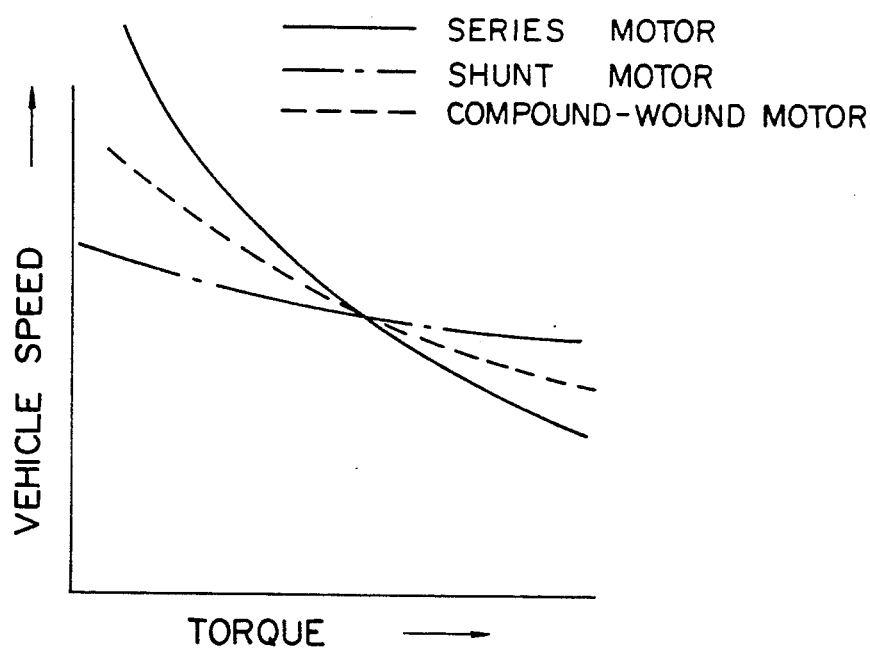
FIG. 4 shows the characteristics of each type of a motor.
Figure 5:
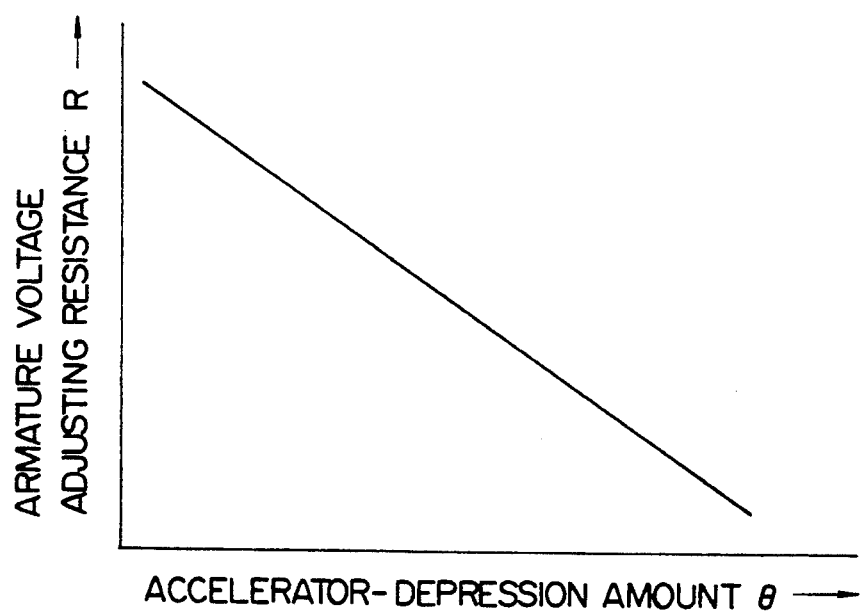
FIG. 5 is a graph showing the relationship between an accelerator depression amount $\theta$ and an armature voltage adjusting resistance R.

Therefore, as is understood from FIG. 4, the motor 6 can be driven under the best condition so that energy efficiency and travelling performance of the vehicle 1 can be improved.

In the setting section 33, an armature voltage adjusting resistance R of the motor 6 is retrieved from the map MR with the depression amount $\theta$ as a parameter.

Then, the actuator 13a is driven through the drive section 34 to set the value of the resistor 13 connected in series to the series coil 6c of the motor 6 to the resistance R thus retrieved from the map MR.

The resistance R which is inverse proportion to the amount $\theta$ is prestored in the map MR. Accordingly, the larger the amount $\theta$, the smaller the resistance R becomes to boost a voltage applied to the armature coil 6a so as to produce the required torque and vehicle speed.

Figure 6:
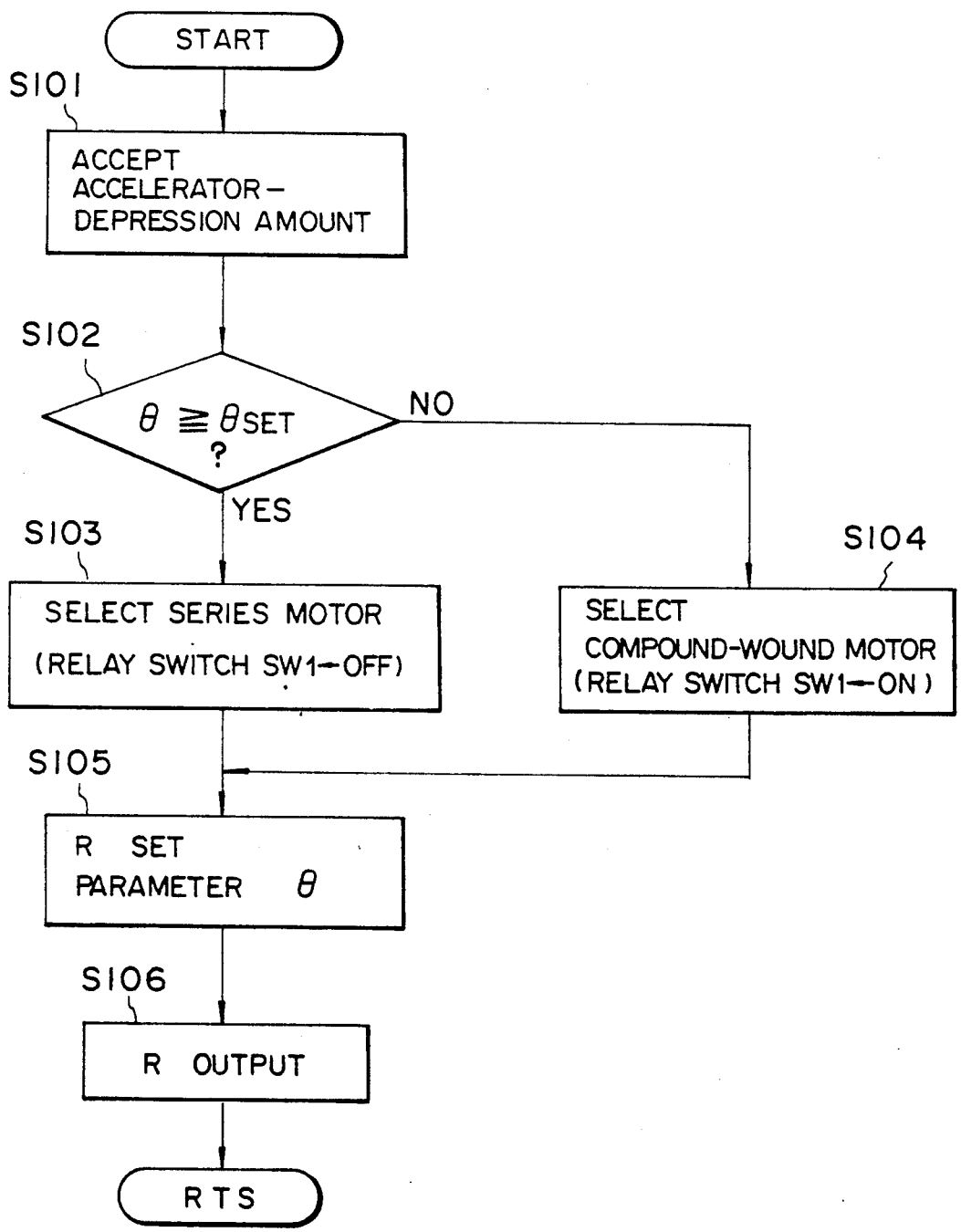
FIG. 6 is a flowchart showing control procedure of the motor.

The operation of the preferred embodiment according to the present invention will be explained with reference to the flowchart shown in FIG. 6. This flowchart shows a program which is repeated per specific period of time or cycle while the electric vehicle 1 is travelling by the motor 6 which is started by turning on the key switch 27.

First in STEP 101, the depression amount $\theta$ from the sensor 12 is accepted. Then, the depression amount $\theta$ and a specific preset value $\theta$SET are compared with each other in STEP 102.

The program advances to STEP 103 from STEP 102 if $\theta \geq \theta$SET. In STEP 103, the relay switch SW1 is turned off to select the series motor-type and the program advances to STEP 105.

On the other hand if $\theta < \theta$SET in STEP 102, the program advances to STEP 104 in which the relay switch SW1 is turned on to select the compound-wound motor-type and the program advances to STEP 105.

In STEP 105, the resistance R is retrieved from the map MR with the depression amount $\theta$ as a paramemter and the program advances to STEP 106.

In STEP 106, the actuator 13a is driven to adjust the resistor 13 of the motor 6 to the resistance R. Then, the program returns to STEP 101.

Figure 7:
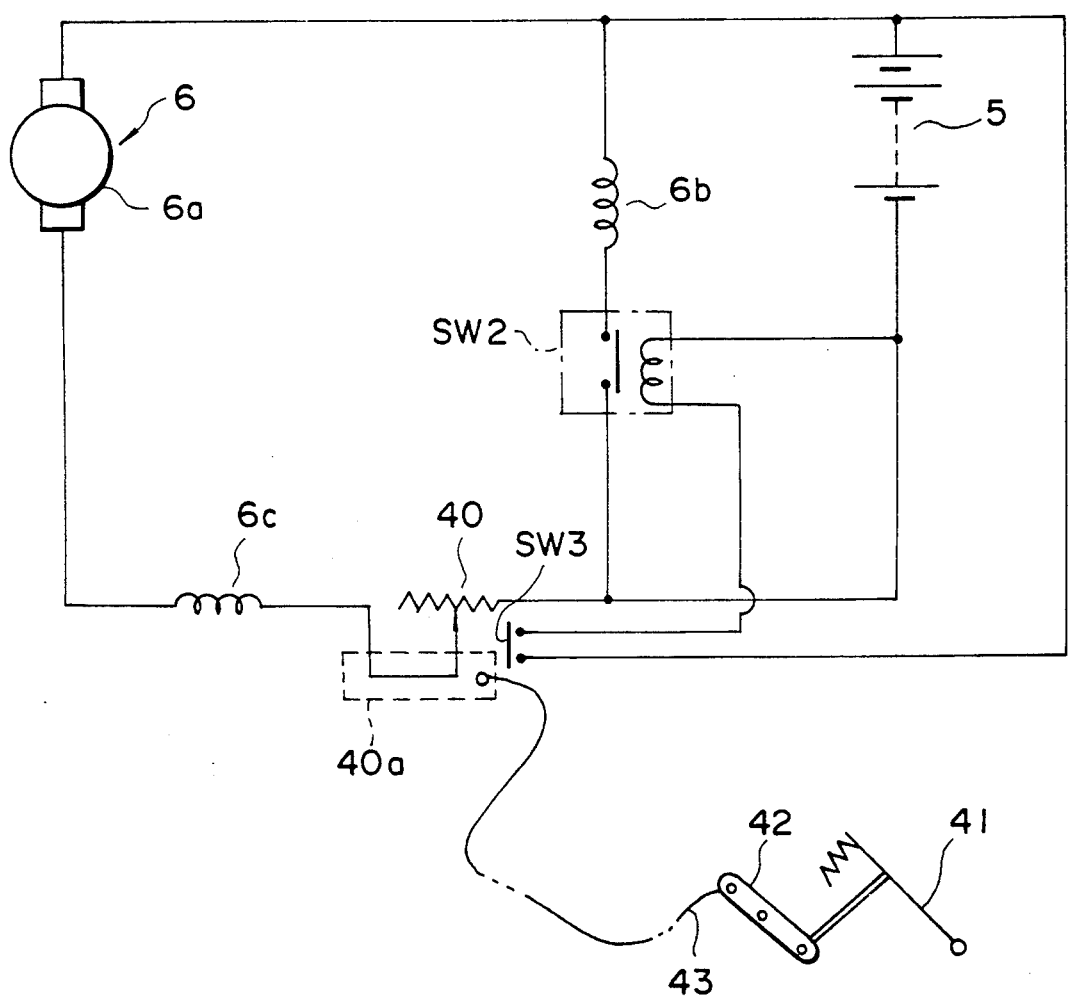
FIG. 7 shows another preferred embodiment of a motor control circuit in the control system according to the present invention.

FIG. 7 shows another preferred embodiment according to the present invention. In the figure, a normallyclosed contact of a relay SW2 as a switching means is connected in series to a shunt coil 6b which is connected in parallel to an armature coil 6a of a motor 6. And also an armature voltage adjusting resistor 40 is connected in series to a series coil 6c which is connected in series to the armature coil 6a.

A resistance-control slider 40a of the resistor 40 is, as depicted by a broken line, communicated to an accelerator 41 through a wire 43 and a link 42. The relay switch SW2 is interlocked by the accelerator 41 to be intermittently disconnected from a battery 5 through a limit switch SW3 operated according to a specific depression amount $\theta AC$.

The limit switch SW3 is usually opened when the depression amount of the accelerator 41 is small. Thus, the relay switch SW2 is on and the motor 6 is a compound-wound-type.

On the other hand, the limit switch SW3 is closed when the depression amount of the accelerator 41 becomes larger than $\theta AC$. Then, an electric power is supplied to the relay switch SW2 to open its contact so as to turn off the relay switch SW2. The shunt coil 6b is thus disconnected from the battery 5 and the motor 6 is switched to a series motor-type from the compound-wound-type. The slider 40a of the resistor 40 slides due to the wire being pulled in response to the depression amount or the load through the link 42. Therefore, the resistance 40 decreases to produce the required torque and vehicle speed in accordance with the increase of the load.

Figures 8A, 8B:
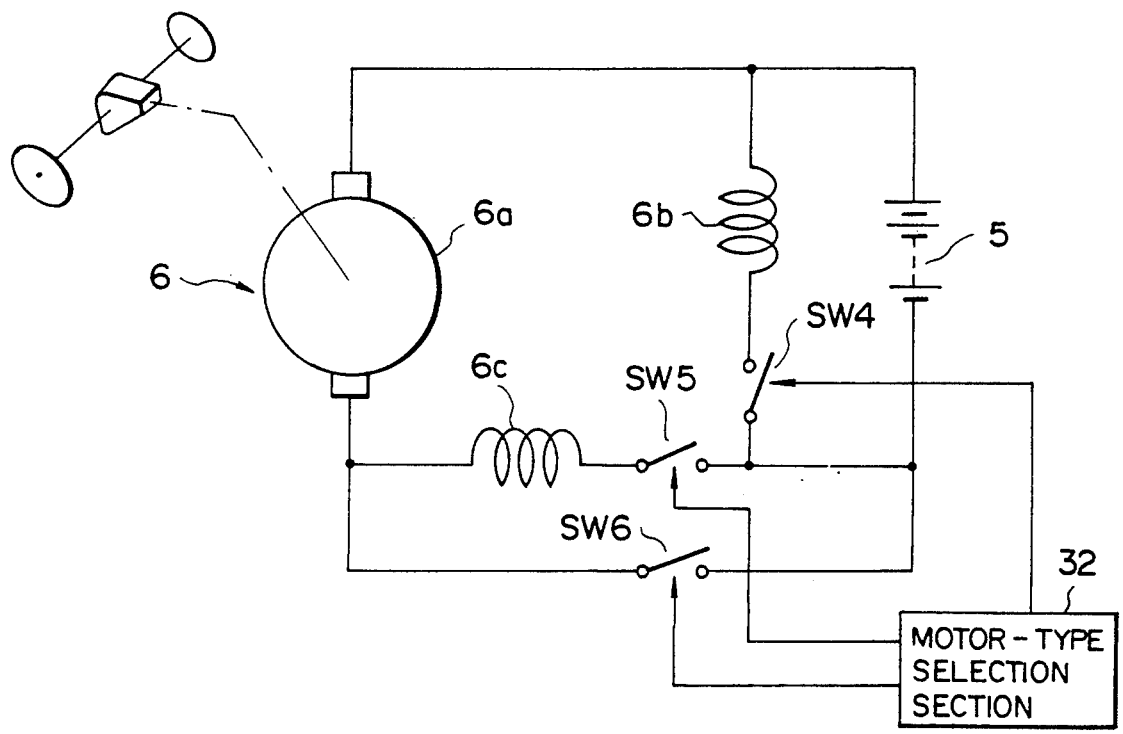
FIGS. 8A and 8B show still another preferred embodiment of the motor control circuit and a combination of switches thereof according to the present invention.

Next in FIG. 8A, a shunt coil 6b is connected in parallel to an armature coil 6a of a motor 6, and a series coil 6c is connected in series to the armature coil 6a. A switch SW4 is connected in series to the shunt coil 6b. A switch SW5 is connected in series to the series coil 6c. Furthermore, a switch SW6 is connected in parallel to a series circuit of the series coil 6c and the switch SW5.

As is shown in FIG. 8B, the motor-type selection section 32 controls a switching means such as the switches SW4, SW5 and SW6 so that the motor 6 operates as a compound-wound motor, a shunt motor or a series motor according to the travelling state. The switch SW5 may be eliminated since it is to surely disconnect the series coil 6c from the battery 5.

Figure 9:
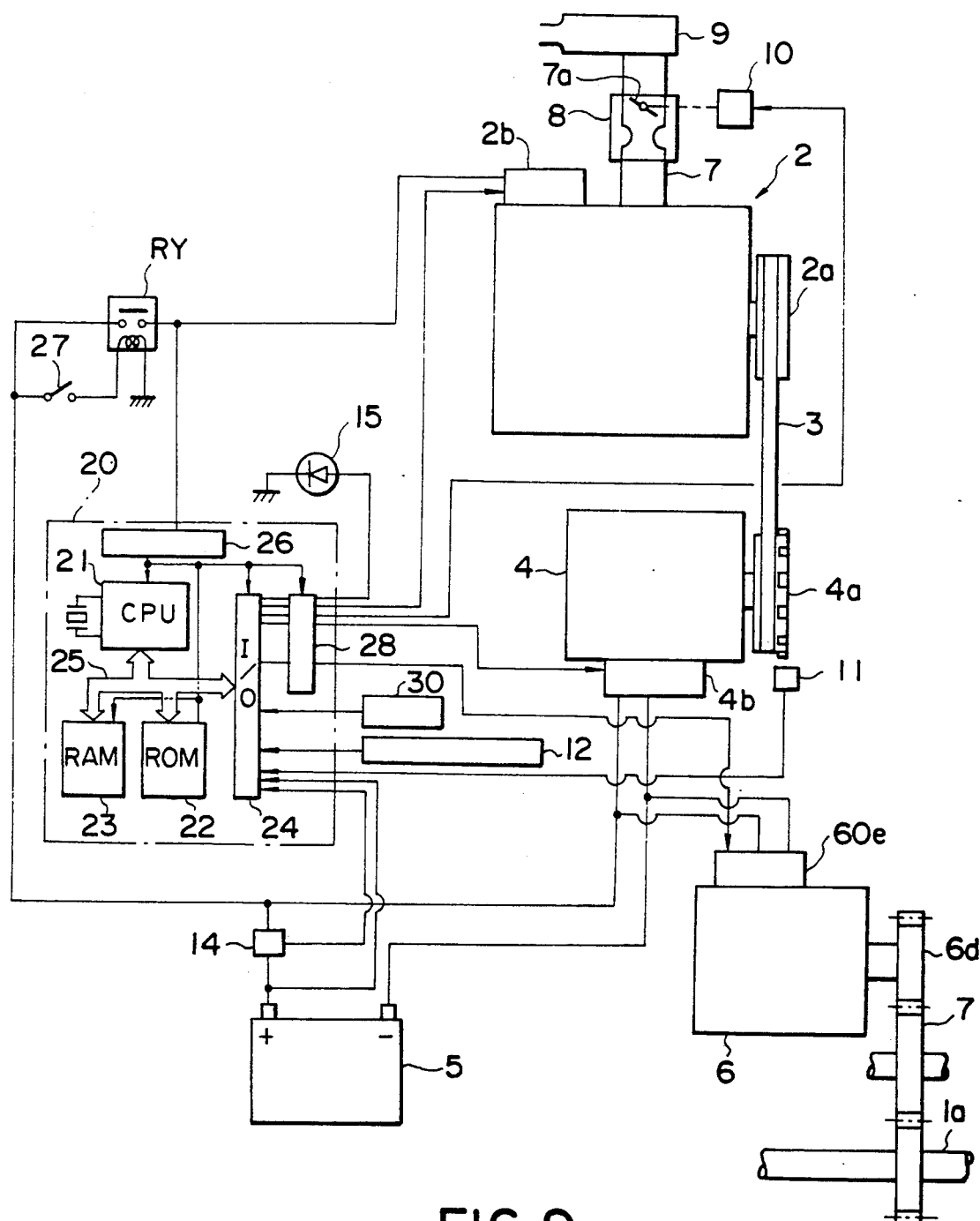
FIG. 9 shows a further preferred embodiment of control system according to the present invention.

As is shown in FIG. 9, the engine 2 in a further preferred embodiment of the present invention has a vehicle speed sensor 30 and a current sensor 14 connected to the battery 5 at its positive terminal are connected to the input port of the I/O interface 24. An alarm LED 15 is connected to the drive circuit 28. Other configuration in FIG. 9 is the same as that in FIG. 2.

A motor control circuit 60e will be explained with reference to FIG. 10. In the figure, a field current/voltage adjusting resistor 16 is connected in series to a shunt coil 6b. Furthermore, a relay contact (corresponding to the switch SW4 in FIG. 8A) of a relay switch SW10 is connected in series to the resistor 16.

An armature voltage adjusting resistor 13 is connected in series to a series coil 6c. A relay contact (corresponding to the switch SW5 in FIG. 8A) of a relay switch SW20 is connected in series to the resistor 13. A relay contact (corresponding to the switch SW6 in FIG. 8A) of a relay switch SW30 is connected in parallel to the series circuit of the series coil 6c, the resistor 13 and the relay contact of the relay switch SW20.

The values of the resistors 13 and 16 are adjusted by resistance-control actuators 13a and 16a, respectively.

The ROM 22 is prestored with a control program and fixed data such as control data. On the other hand, the RAM 23 is stored with data obtained after calculating output signals from each of the sensors and also a monitored-value of the terminal voltage of the battery 5.

Signals from each of the sensors are processed by the CPU 21 according to the control program prestored in the ROM 22. Then, an engine-stop signal to the ignition circuit 2b, a control signal to the generator control circuit 4b, a drive signal to the rotary actuator 10 and a control signal to the control circuit 60e are calculated by the CPU 21.

The opening of the throttle valve 7a of the engine 2 is controlled by the rotary actuator 10 which is driven by the CPU 21. Furthermore, charging to the battery 5 is controlled by the generator 4 whose rotation speed is adjusted to a specific value by the CPU 21. The motor 6 is also switched between the series, the shunt or the compound-wound motor-type by the CPU 21, according to the traveling state of the vehicle 1.

Figure 10:
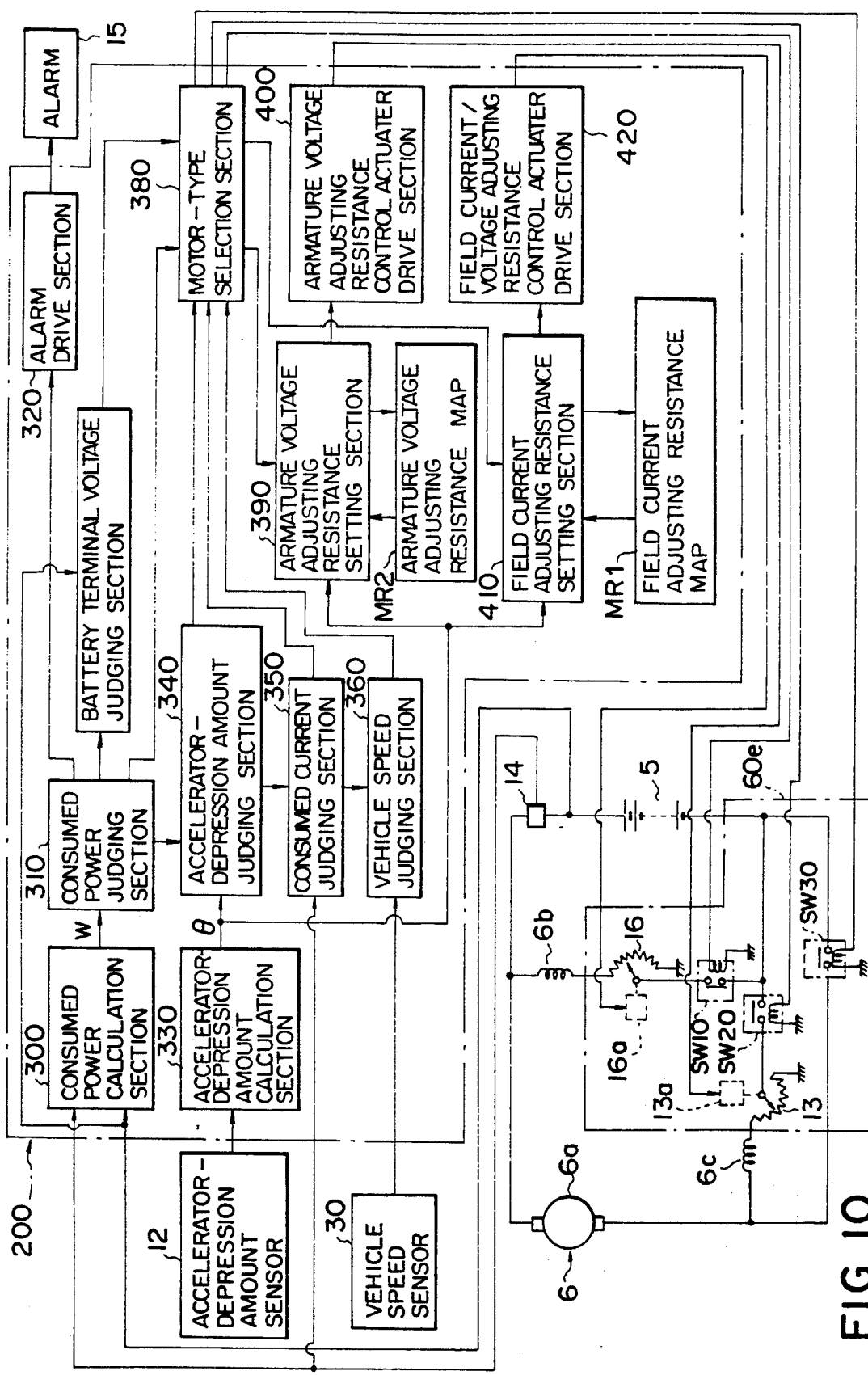
FIG. 10 shows a functional block diagram of the control system shown in FIG. 9.

As is also shown in FIG. 10, the controller 200 comprises a consumed-power calculation section 300, a consumed-power judging section 310, an alarm drive section 320, an accelerator depression amount calculation section 330, an accelerator depression amount judging section 340, a consumed current judging section 350, a vehicle speed judging section 360, a battery terminal voltage judging section 370, a motor-type selection section 380, an armature voltage adjusting resistance setting section 390, an armature voltage adjusting resistance map MR2, an armature voltage adjusting resistance-control actuator drive section 400, a field current adjusting resistance setting section 410, a field current adjusting resistance map MR1, a field current adjusting resistance-control actuator drive section 420.

A consumed power W is calculated by means of a terminal voltage $V_B$ of the battery 5 and a consumed current A of the motor 6 detected by the sensor 14 (W $=V_B \times A$) in the calculation section 300.

The consumed power W thus calculated is judged as to whether it is smaller than a specific preset value WSET in the judging section 310.

The alarm LED 15 is then turned on by the alarm drive section 320 to warn a driver if it is judged in the judging section 310 that the calculated consumed power W exceeds the preset value WSET.

A depression amount $\theta$ is calculated in the calculation section 330 based on a signal from the sensor 12.

The depression amount $\theta$ thus calculated is judged as to whether it is smaller than a specific preset value OSET or not in the judging section 340 if the calculated consumed power W is judged smaller than the preset value WSET in the judging section 310.

The consumed current A detected by the sensor 14 is judged as to whether it is larger than a specific preset value ASET or not in the judging section 350 if the calculated depression amount $\theta$ is judged larger than the preset value OSET in the judging section 340.

Furthermore, a vehicle speed S detected by the sensor 30 is judged as to whether it is smaller than a specific preset value SSET in the judging section 360 if the detected consumed current A is judged to be larger than the preset value ASET in the judging section 350.

The terminal voltage $V_B$ of the battery 5 is judged as to whether it is smaller than a specific preset value VSET in the judging section 370 if the calculated consumed power W is judged to be larger than the preset value WSET in the judging section 310.

All the judging results of the judging sections 310, 340, 350, 360 and 370 are received by the selection section 380 to select the type of the motor 6 among the series motor-type, the shunt motor-type and the compound-wound motor-type.

The relay switches SW10 and SW30 are turned off and the relay switch SW20 is turned on in the motor control circuit 60e if the series motor-type is selected.

The relay switches SW10 and SW30 are turned on and the relay switch SW20 is turned off if the shunt motor-type is selected.

Furthermore, the relay switches SW10 and SW20 are turned on and the relay switch SW30 is turned off if the compound-wound motor-type is selected.

The motor 6 is set up as the compound-wound motor without any condition to reduce the power consumption if the present consumed power W is larger than the preset value WSET. The motor 6 is also set up as the compound wound motor to restrict power reduction of the battery 5 if the consumed power W and the depression amount $\theta$ are smaller than preset values WSET and $\theta$SET, respectively.

Further, the motor 6 is set up as the series motor under the travelling state that the vehicle speed S is lower than the preset value SSET and a larger torque is required if the consumed power W is smaller than the preset value WSET and the depression amount $\theta$ is larger than the preset value $\theta$SET. Furthermore, the motor 6 is set up as the shunt motor under the travelling state that the vehicle speed S is higher than the preset value SSET and a large torque is not required but a stable vehicle speed is required.

Therefore, the motor 6 can be driven under the best condition of the characteristics shown in FIG. 4 according to the travelling state to improve energy efficiency and the travelling performance greatly.

In the setting section 390, an armature voltage adjusting resistance R2 of the motor 6 is retrieved from the map MR2 with the depression amount $\theta$ calculated by the calculation section 330 as a parameter $\theta$ when the motor 6 is set up as the series motor or the compound-wound motor in the selection section 380.

The actuator 13a is then driven through the drive section 400 to adjust the resistor 13 connected in series to the series coil 6c of the motor 6 to the resistance R2.

In the setting section 410, a field current adjusting resistance R1 is retrieved from the map MR1 with the depression amount $\theta$ calculated by the calculation section 330 as a parameter $\theta$ when the motor 6 is set up as the shunt motor or the compound-wound motor in the selection section 380.

The actuator 16a is then driven through the drive section 420 to adjust the resistor 16 connected in series to the shunt coil 6b of the motor 6 to the resistance R1.

Figure 11:
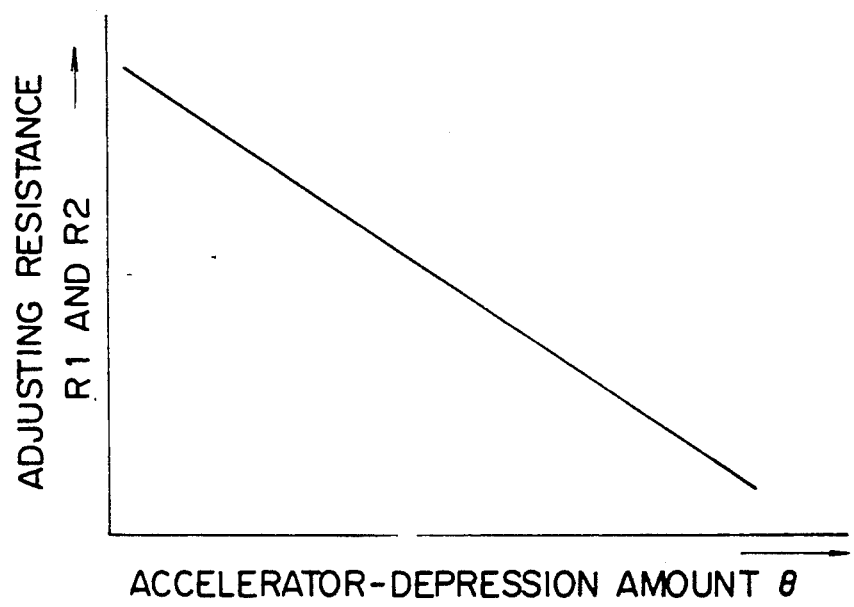
FIG. 11 is a graph showing the relationship between the accelerator depression amount $\theta$ and the adjusting resistances $R_1$ and $R_2$.

As is shown in FIG. 11, the resistance R1 and R2 which are inverse proportion to the depression amount $\theta$ are prestored in the maps MR1 and MR2, respectively. The larger the depression amount $\theta$, the smaller the resistance R1 and R2 to boost voltages applied to the armature coil 6a and the series coil 6c l in the case of the series motor-type. The current applied to the shunt coil 6b are made larger and the current applied to the armature coil 6a is made smaller with the increase of the depression amount $\theta$ in the case of the shunt motor. A combination of the above two cases are brought into the compound-wound motor-type when selected.

Figure 14:
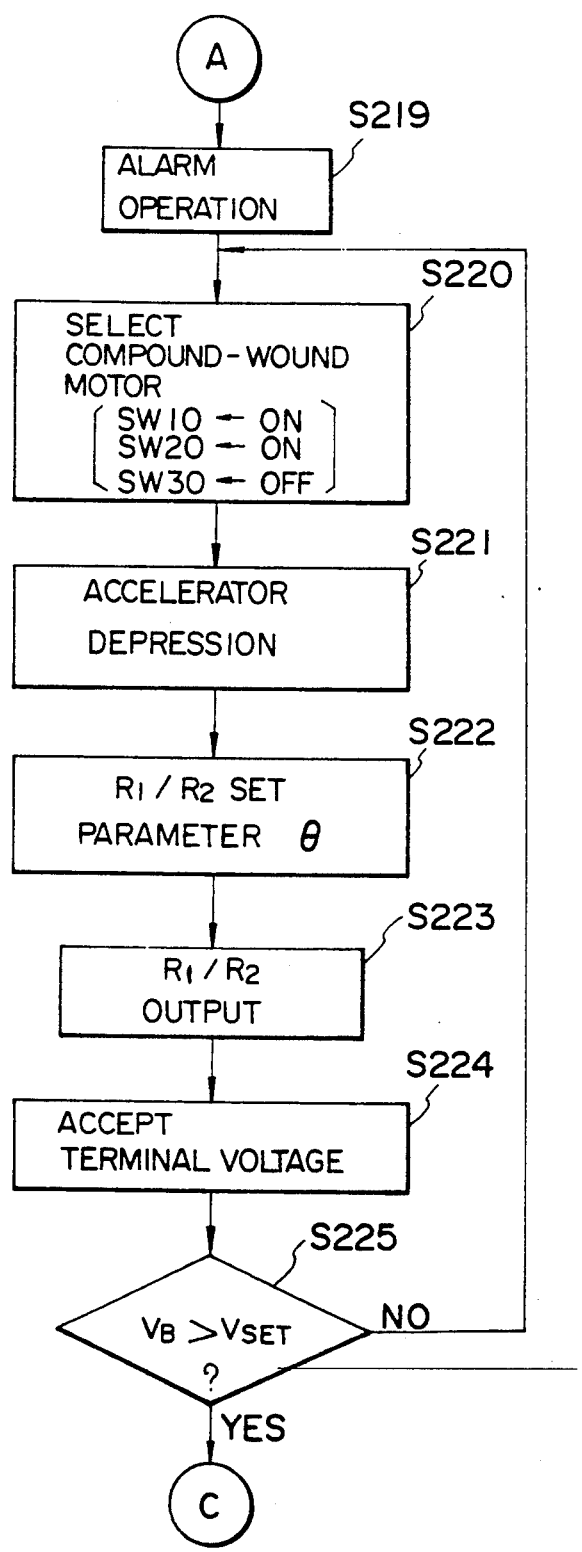

The operation of the further preferred embodiment according to the present invention will be explained with reference to the flowcharts shown in FIGS. 12 and 14. These flowcharts show a program which is repeated per specific period of time or cycle while the electic vehicle 1 is travelling by the motor 6 which is started by turning on the key switch 27.

Figure 12:
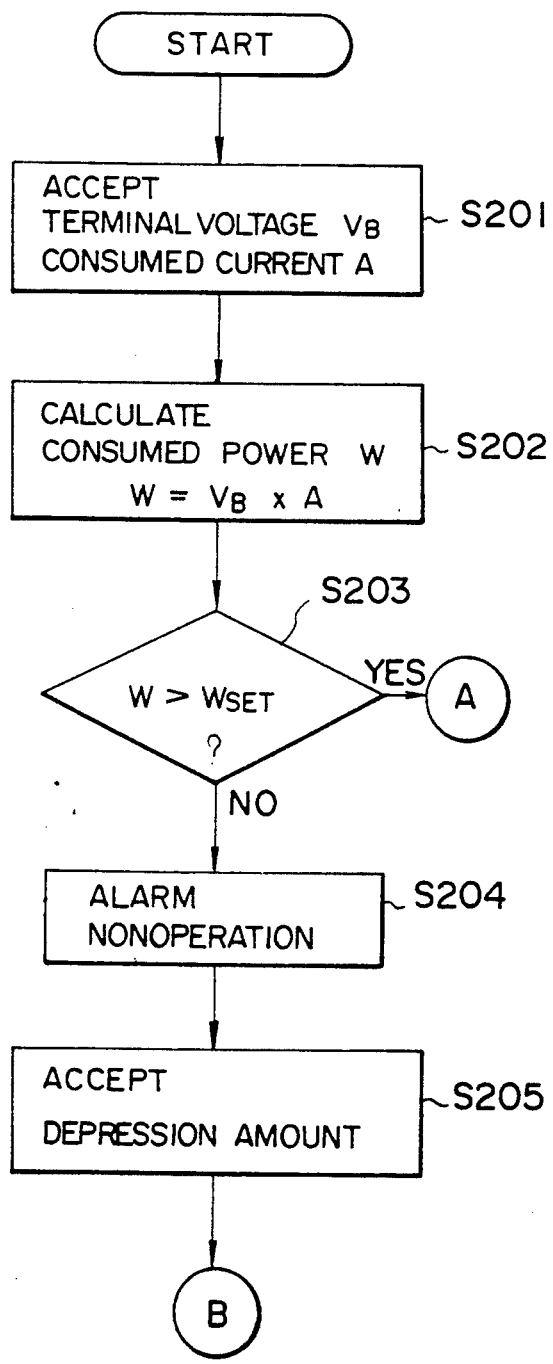
FIGS. 12 to 14 are flowcharts showing control procedure of the motor.

First in STEP 201 shown in FIG. 12, a terminal voltage $V_B$ of the battery 5 and a consumed current A of the motor 6 detected by the sensor 14 are accepted.

In STEP 202, a consumed power W associated with the operation of the motor 6 is calculated by means of the terminal voltage $V_B$ and the consumed current A thus accepted ($W = V_B \times A$). Then, the program advances to STEP 203.

The calculated consumed power W is compared with the preset value WSET in STEP 203. The program advances to STEP 219 shown in FIG. 14 if W>WSET. On the other hand, the program advances to STEP 204 in which a drive signal is stopped to turn off the alarm LED 15. Then, the program advances to STEP 205.

Figure 13:
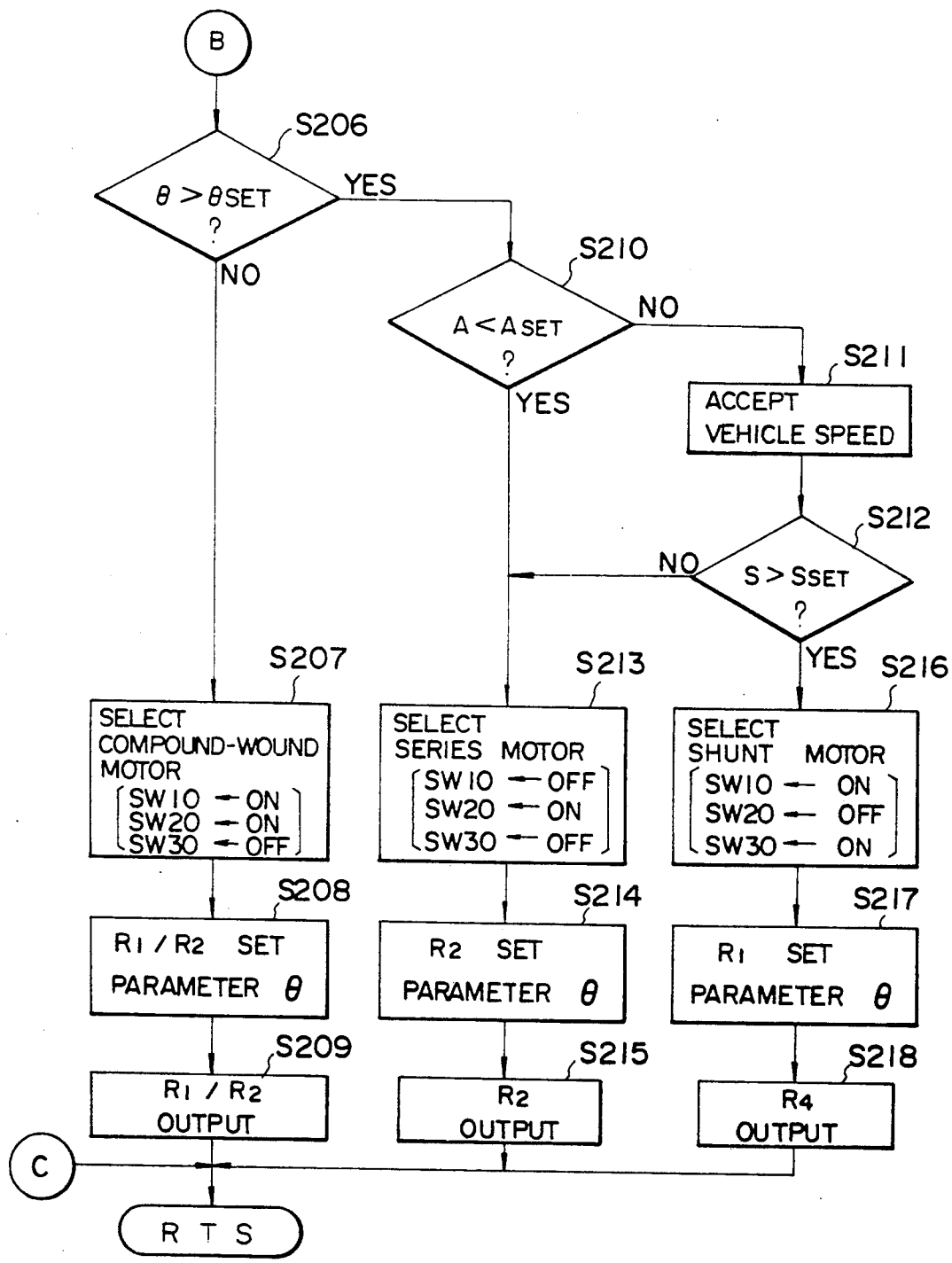

The accelerator depression amount $\theta$ is accepted in STEP 205. The depression amount $\theta$ is compared with a preset value $\theta$SET in STEP 206 shown in FIG. 13. The program advances to STEP 207 if $\theta \leq \theta$SET, in which the relay switches SW10 and SW20 are turned on and the relay switch SW30 is turned off to set up the motor 6 as the compound-wound motor-type. Then, the program advances to STEP 208.

In STEP 208, the resistances R1 and R2 are respectively retrieved from the maps MR1 and MR2 with the depression amount $\theta$ as a parameter. The program then advances to STEP 209.

The actuators 16a and 13a are driven to set each of values of the resistors 16 and 13 to the resistances R1 and R2 determined in STEP 208. Then, the program returns to STEP 201.

On the other hand, if $\theta > \theta$SET in STEP 206, the program advances to STEP 210. The consumed current A accepted in STEP 201 and a preset value ASET are compared with each other in STEP 210. Then, the program advances to STEP 213 if A<ASET, while to STEP 211 if A$\geq$ASET.

A vehicle speed S is accepted from the sensor 30 in STEP 211. Then, the vehicle speed S and a preset value SSET are compared with each other in STEP 212. The program advances on STEP 213 if S$\leq$SSET in STEP 212.

In STEP 213, the relay switches SW10 and SW30 are turned off and the relay switch SW20 in turned on in the motor control circuit 60e to select the series motor-type.

Next in STEP 214, the resistance R2 is retrieved from the map MR2 with the depression amount $\theta$ as a parameter accepted in STEP 205. Then, the program advances to STEP 215.

The actuator 13a is driven to set the resistor 13 to the resistance R2 determined in STEP 114. Then, the program returns to STEP 201.

Furthermore if S>SSET in STEP 212, the program advances to STEP 216. In STEP 216, the relay switches SW10 and SW30 are turned on and the relay switch SW20 is turned off in the motor control circuit 60e to select the shunt motor-type. Then, the program advances to STEP 217.

In STEP 217, the resistance $R_1$ is retrieved from the map MR1 with the depression amount $\theta$ as a paramemter accepted in STEP 205. The program advances to STEP 218.

The actuator 16a is driven to set the value of the resistor 16 to the resistance R₁ determined in STEP 217. Then, the program returns to STEP 201.

Still furthermore, the program advances to STEP 219 from STEP 203 if the calculated consumed power W is larger than the preset value WSET.

In STEP 219, the alarm LED 15 is turned on and then in STEP 220 the relay switches SW10 and 20 are turned on and the relay switch SW30 is turned off to select the compound-wound motor-type. Then, the program advances to STEP 221.

A depression amount $\theta$ from the sensor 12 is accepted in STEP 221 and then in STEP 222, the resistance R₁ and R₂ are respectively retrieved from the maps MR1 and MR2 with the depression amount $\theta$ as a paramemter accepted in STEP 221. The program advances to STEP 223.

The actuators 16a and 13a are driven to set each of values of the resistors 16 and 13 to the resistance R₁ and R₂ determined in STEP 222. The program then advances to STEP 224.

In STEP 224, the terminal voltage $V_B$ is again accepted and then in STEP 225, the terminal voltage $V_B$ and the preset reference voltage VSET are compared with each other. The program returns to STEP 220 to set the motor to the compound-wound motor-type if $V_B \leq$ VSET and the program returns to STEP 201 to determine the motor-type again if $V_B >$ VSET.

Figure 15:
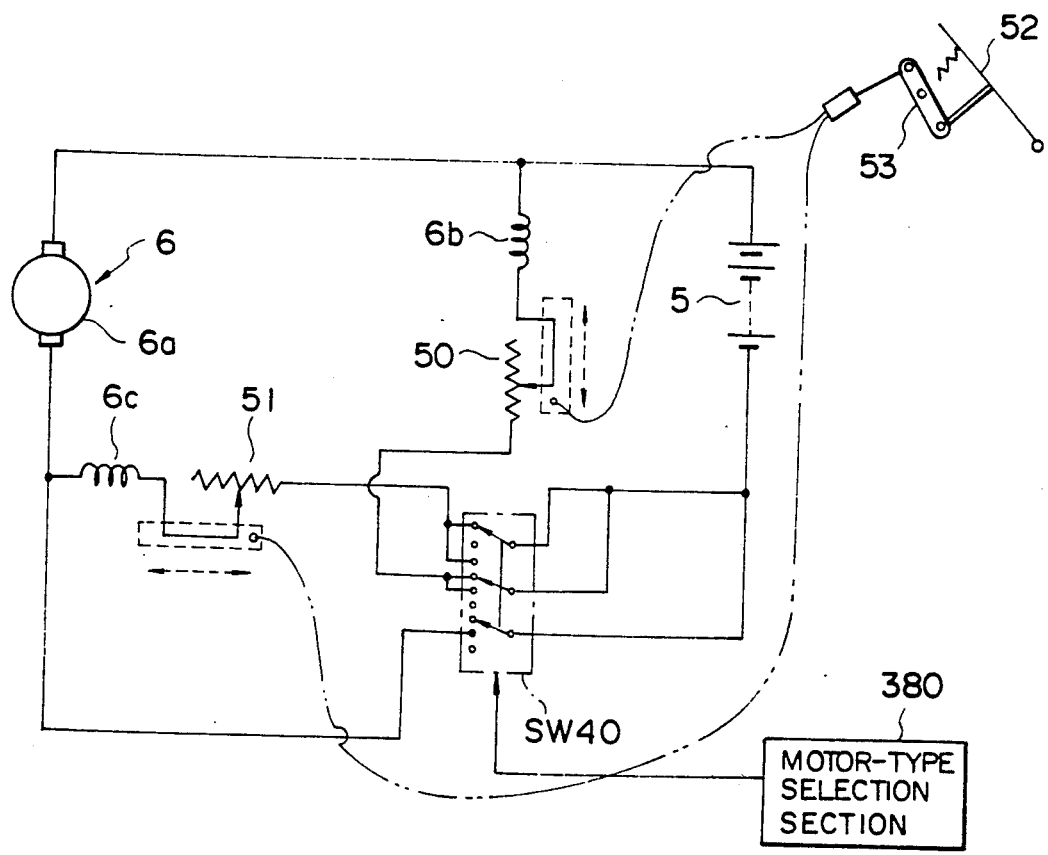
FIG. 15 shows a still further preferred embodiment of the motor control circuit according to the present invention.

Next, FIG. 15 shows a still further preferred embodiment according to the present invention. In the figure, a field current adjusting resistor 50 connected to a shunt coil 6b of a motor 6 and an armature voltage adjusting resistor 51 connected to a series coil 6c are communicated to an accelerator 52 through wires 54a and 54b and a link 53.

Connection of an armature coil 6a to the shunt coil 6b and also the series coil 6c are switched by a switching means composed of an interlocked switch SW40 which is operated by the motor-type selection section 380 according to travelling condition.

FIG. 15 now represents the compound-wound motor-type. The motor 6 is then switched to the shunt motor-type when three contractors of the switch SW40 are switched one stage downward, respectively. The motor 6 is switched to the series motor-type when each contractor of the switch SW40 is switched one more stage downward.

The wires 54a and 54b are pulled through the link 53 when the accelerator 52 is depressed to make values of the resistance 50 and 51 less so as to obtain the required torque and a vehicle speed.

As is understood from the foregoing, the present invention provides a switching means for switching connection between an armature coil and a series coil and a shunt coil of a vehicle motor according to travelling condition. One motor is thus switched to a compound-wound motor type, a series motor-type and a shunt motor-type to obtain best motor characteristics matching with the traveling condition. Therefore, such as vehicle performance and cost performance are greatly improved.

What is claimed is:

1. A switching apparatus for an electric motor mounted on a vehicle, having a battery, a motor for driving said vehicle depending on power from said battery, a motor control circuit for controlling said motor, an accelerator for said vehicle, accelerator depression sensing means for sensing the amount of accelerator depression vehicle speed sensing means for sensing a vehicle speed, voltage detecting means for detecting a terminal voltage of said battery and current detecting means for detecting a field current supplied to said motor, said motor including an armature coil connected to said battery, a shunt coil connected to said battery in parallel to said armature coil and a series coil connected to said battery in series to said armature coil, said major control circuit including first switching mean connected in series to said shunt coil, second switching means connected in series to said series coil and third switching means connected in parallel to said series coil and said first switching means, the apparatus comprising:
consumed power calculation means for calculating an electrical consumed power of said motor based on said terminal voltage and said current;
consumed power judging means for judging whether said consumed power is larger than a predetermined power value; and
motor selection means for selecting a compound-wound motor when said consumed power judging means judges that said consumed power is larger than said predetermined power value and for controlling said first, second and third switching means so as to conduct current through both of said series coil and said shunt coil.

2. The apparatus according to claim 1, wherein said motor selection means is adapted to turn on said first and second switching means and turn off said third switching means when said compound-wound motor is selected.

3. The apparatus according to claim 1, further comprising:
alarm for warning an operator when said consumed power judging means judges that said consumed power is larger than said predetermined power value.

4. The apparatus according to claim 1, wherein said motor control circuit further includes a first variable resister connected in series to said shunt coil and said first switching means for varying field current supplied to said armature and said shunt coil and a second variable resistor connected in series to said series coil and said second switching means for varying voltage applied to said armature coil nd said series coil, both resistor being adapted for changing values thereof depending on the accelerator depression.

5. The apparatus according to claim 4, further comprising:
field current adjusting resistance setting means for setting a first resistance value of said first variable resistor based on said accelerator depression when said compound-wound motor is selected; and
voltage adjusting resistance setting means for setting a second resistance value of said second variable resistor based on said accelerator depression when said compound-wound motor is selected, whereby said compound-wound motor produces torque matching to said accelerator depression.

6. The apparatus according to claim 4, further comprising:
connecting means for connecting each of said first variable resistor and said second variable resistor to said accelerator to change values of each resistor depending on the accelerator depression.

7. The apparatus according to claim 5, wherein said current adjusting resistance setting means comprises a field current adjusting resistance map which is set based on the proportional relationship of said first resistance value to said accelerator depression.

8. The apparatus according to claim 5, wherein said voltage adjusting resistance setting means comprises a voltage adjusting resistance map which is set based on the proportional relationship of said second resistance value to said accelerator depression.

9. The apparatus according to claim 5, further comprising:
battery terminal voltage judging means for judging whether said battery terminal voltage is larger than a predetermined voltage and imposing said motor selection means to maintain said compound-wound motor when said battery terminal voltage is smaller than said predetermined voltage.

10. The apparatus according to claim 5, further comprising:
accelerator depression judging means for judging whether said accelerator depression is larger than a predetermined amount when said consumed power judging means judges that said consumed power is smaller than said predetermined power value;
said motor selection means being adapted to select said compound-wound motor and control said first, second and third switching mans so as to conduct current through both of said series coil and said shunt coil when said accelerator depression judging means judges that said accelerator depression is smaller than said predetermined amount.

11. The apparatus according to claim 28, further comprising:
consumed current judging means or judging whether said field current is smaller than a predetermined current value when said accelerator depression judging means judges that said accelerator depression is larger than said predetermined amount;
said motor selection means being adapted to select a series motor and control said first, second and third switching means so as to conduct current through said series coil only when said consumed current judging means judges that said field current is smaller than said predetermined current value.

12. The apparatus according to claim 11, wherein said motor selection means is adapted to turn on said second switching means and turn of said first and third switching means when said series motor is selected.

13. The apparatus according to claim 11, wherein said voltage adjusting resistance setting means is adapted to set said second resistance value of said second variable resistor based on said accelerator depression when said series motor is selected, whereby said series motor produces torque matching said accelerator depression.

14. The apparatus according o claim 11, further comprising:
vehicle speed judging means for judging whether said vehicle speed is higher than a predetermined speed when said consumed current judging means judges that said field current is larger than said predetermined current value;
said motors selection means being adapted to select a shunt motor and control said first, second and third switching means so as to conduct current through said shunt coil only when said vehicle speed judging means judges that said vehicle speed is higher tan said predetermined vehicle speed.

15. The apparatus according to claim 14, wherein said motor selection means is adapted to select said series motor and control said first, second and third switching means so as to conduct current through said series coil only when said vehicle speed judging means judges that said vehicle speed is lower than said predetermined vehicle speed.

16. The apparatus according o claim 14, wherein said motor selection mans is adapted to turn on said first and third switching means and turn off said second switching means when said shunt motor is selected.

17. The apparatus according to claim 14, wherein said shunt coil current adjusting resistance setting means is adapted to set said first resistance value of said first variable resister based on said Accelerator depression when said hunt motor is selected, whereby said shunt motor produces torque matching said accelerator depression.

18. A switching apparatus for an electric motor mounted on a vehicle, having a battery, a motor for driving said vehicle depending on a power from said battery, a motor control circuit or controlling the status of said motor, an accelerator for said vehicle, accelerator depression sensing means for sensing the amount of accelerator depression, vehicle speed sensing means or sensing a vehicle speed, voltage detecting means for detecting a terminal voltage of said battery and current detecting means for detecting a field current supplied to said motor, said motor including an armature coil connected to said battery, a shunt coil connected to said battery in parallel to said armature coil and a series coil connected to said battery in series to said armature coil, said motor control circuit including first switching means connected in series to said shunt coil, second switching means connected in series to said series coil and third switching means connected in parallel to said saris coil and said first switching means, the apparatus comprising:
consumed power calculation means for calculating electrical consumed power of said motor based on said terminal voltage and said current; and
selection means for selecting one of a shunt motor, a series motor and a compound-wound motor based on the magnitude of said consumed power, said battery terminal voltage, said accelerator depression, said field current and said vehicle speed and for controlling said first, second and third switching means so as to make said motor function as the selected motor.

19. The apparatus according to claim 18, wherein said selection means is adapted to select said compound-wound motor when said consumed power is smaller than a predetermined power value or when said consumed power is larger than said predetermined power value and said accelerator depression is smaller than a predetermined amount.

20. The apparatus according to claim 19, wherein said selection means is adapted to select said series motor when said accelerator depression is lager than said predetermined amount and said field current si smaller than a predetermined current value or when said accelerator depression is larger tan said predetermined amount, said field current is larger than said predetermined current value and said vehicle speed is larger tan a predetermined speed.

21. The apparatus according o claim 20, wherein said selection means is adapted to select said shunt motor when said vehicle speed is alert than said predetermined speed.

22. A switching apparatus for an electric motor mounted on a vehicle having an accelerator for controlling a vehicle speed, the apparatus which comprises:
- a battery;
- an armature coil connected to said battery;
- a shunt coil connected to said battery in parallel to said armature;
- a series coil connected to said battery in series to said armature;
- a first variable resistor provided between the shunt coil and the battery for varying the current applied to said shunt coil;
- a second variable resistor provided between the series coil and the battery or varying the voltage applied to said series coil;
- first switching mean provided in series with said first variable resistor for switching the battery and said hunt coil;
- second switching means provided in series with said second variable resistor switching the battier and said series coil;
- third switching means provided in parallel with said series coil and said second switching means for switching the batter and said armature;
- accelerator detecting means for detecting an operating value of the accelerator and for producing an accelerator signal;
- current detecting mean for detecting a current supplied to the motor nd for producing a current signal;
- voltage detecting means for detecting termainl voltage of the battery and for producing a voltage signal;
- vehicle speed sensor for detecting a vehicle speed and for providing a speed signal;
- power consumption calculating mean responsive to said voltage signal and said current signal for calculating an electrical power consumption and for producing a consumption signal;
- resistance controlling means responsive to said accelerator signal for controlling resistance of said first variable resistor and said second variable resistor;
- first judging means responsive to said consumption signal for judging whether said consumption signal is larger than a predetermined consumption value or not and for producing a first positive condition signal when said consumption signal is larger than said predetermined consumption value and for producing a first negative condition signal when said consumption signal is smaller tan said predetermined consumption value;
- second judging means responsive to said accelerator signal and said first negative condition signal for judging whether said accelerator signal is larger than a predetermined value onto and for producing a second positive condition signal when said accelerator signal is larger than said predetermine value and for producing a second negative condition signal when said accelerator signal is smaller than said predetermined value;
- third judging means responsive to said current signal and second negative condition signal for judging whether said current signal is smaller than a predetermined current value or not for producing a third positive condition signal when said current signal is larger than a predetermined current value and for producing a third negative condition signal when said current signal is smaller than said predetermined current value;
- fourth judging mean responsive to said speed signal and said third negative condition signal for judging whether said vehicle speed signal is larger than a predetermined speed and for producing a fourth positive condition signal when said vehicle speed signal is larger than a predetermined speed and for producing a fourth negative condition signal when said vehicle speed signal is smaller than said predetermined speed;
- first selecting means for switching on said firs switch means and said second switch means when receiving one of said first positive condition signal and said second negative condition signal;
- second selecting means for switching on said second switch when receiving one of said third positive condition signal and said fourth negative conditions signal; and
- third selecting means or switching on said first switch means and said third switch means when receiving said fourth positive condition signal so as to improve motor characteristics matching with travelling condition.

23. The apparatus according to claim 20, further comprising:
- an alarm device provided to show a warning condition of the motor to an operator; and
- driving means responsive to said first positive condition signal for operating said alarm device.

* * * * *